United States Patent [19]
Martin et al.

[11] Patent Number: 6,083,401
[45] Date of Patent: Jul. 4, 2000

[54] SEPARATIVE MEMBRANE AND METHOD FOR USING THIS MEMBRANE

[75] Inventors: Didier Martin, Givry; Oliver J. Poncelet; Jeannine Rigola, both of Chalon sur Saone, all of France

[73] Assignee: Eastman Kodak Company, Rochester, N.Y.

[21] Appl. No.: 09/062,960

[22] Filed: Apr. 20, 1998

[30] Foreign Application Priority Data

Apr. 24, 1997 [FR] France .................................. 97 05308

[51] Int. Cl.[7] ........................ B01D 61/00; B01D 63/00; B01D 39/00
[52] U.S. Cl. ........................ 210/653; 210/650; 210/651; 210/652; 210/638; 210/321.6; 210/490; 210/257.2; 210/321.75; 210/500.28; 210/500.25; 210/500.26
[58] Field of Search ..................... 210/650, 651, 210/652, 653, 638, 500.25, 500.26, 490, 500.29, 500.28, 321.6, 257.2; 430/398

[56] References Cited

U.S. PATENT DOCUMENTS

| | | |
|---|---|---|
| 4,906,376 | 3/1990 | Fyles . |
| 4,948,506 | 8/1990 | Lonsdale et al. ..................... 210/490 |
| 5,633,125 | 5/1997 | Martin ................................. 430/398 |
| 5,846,428 | 12/1998 | Martin et al. ....................... 210/651 |
| 5,958,245 | 9/1999 | Martin et al. ....................... 210/652 |
| 5,989,433 | 11/1999 | Martin et al. ....................... 210/653 |

FOREIGN PATENT DOCUMENTS

| | | |
|---|---|---|
| 0 007 713 | 2/1980 | European Pat. Off. . |
| 0 638 353 | 2/1995 | European Pat. Off. . |
| 0 729 779 | 9/1996 | European Pat. Off. . |
| 96/13459 | 6/1996 | WIPO . |

*Primary Examiner*—Ana Fortuna

[57] ABSTRACT

The present invention concerns a separative membrane, as well as a separation device containing this membrane, and a method for using this device. The membrane of the present invention comprises a support, the hydrophobicity of one of whose faces has been modified, the opposite face having an active layer comprising an inorganic hydrogel material and an ion carrier. This membrane has improved selectivity.

10 Claims, 2 Drawing Sheets

SEPARATIVE MEMBRANE AND METHOD FOR USING THIS MEMBRANE

The present invention concerns a separative membrane, as well as a separation device containing this membrane, and a selective separation method.

Membranes are very much used in techniques of separating compounds either in aqueous solution or in gaseous phase. The conveying of fluids through membranes occurs by means of different mechanisms which depend on the structure and nature of the membrane. The use of membranes makes it possible to replace conventional extraction methods, for example solvent extraction, selective precipitation, etc. The drawback of these conventional separation methods lies in the fact that the medium containing the chemical species to be separated is significantly modified, for example by dilution, modification of the pH or addition of new chemical species allowing the selective precipitation of some of these species.

The most usual membranes are formed from porous synthetic or natural organic polymers which contain large voids compared with the size of the species being conveyed. Their selectivity is based on the difference in size of the species to be separated. The porosity of the membrane is therefore chosen according to the species to be separated. Commercially available porous membranes have a pore size of between 0.005 $\mu$m and 20 $\mu$m. They are made from a wide variety of polymers in order to obtain a wide range of rigidities and mechanical strengths.

It is known that these porous membranes can be modified by modifying their surface properties according to the application envisaged, the experimental conditions (pH, oxidising medium) or the type of molecules to be separated.

There are also liquid membranes. These liquid membranes for the facilitated conveyance of ions generally comprise a liquid medium containing a carrier with reactive groups; the reactive groups react with a specific solute in order to form a complex which is selectively conveyed through the membrane. Such membranes are described for example in U.S. Pat. No. 4,452,702 (Blasius et al).

In liquid membranes, the conveyor is dissolved in an organic phase which constitutes the membrane. Although very efficient, these liquid membranes are not generally used in industry because of their instability due to the dissolution of the membrane in the medium to be treated, osmotic forces, etc.

There are also membranes of the hydrogel type. These membranes are composite membranes, in general consisting of a porous support on which a layer of hydrogel has been deposited. These layers of hydrogel are cross-linked three-dimensional lattices having a very high degree of hydration.

The patent application WO 90/09230 describes a composite membrane comprising a porous support covered with a layer of hydrogel having a hydration greater than 70% by weight, the layer of hydrogel consisting of an organic three-dimensional lattice. This membrane is particularly adapted to the filtration of solutions containing proteins.

The patent application EP 638 353 describes a membrane for the separation of carbon dioxide consisting of a hydrogel film obtained by the copolymerization of a vinyl alcohol with acrylic acid, the layer of hydrogel being impregnated with a solution containing a carrier of carbon dioxide.

These membranes of the organic hydrogel type have the drawbacks of being mechanically weak and sensitive to chemical attack.

Given the increasing need which exists to perform more effective separations or extractions, in particular because of environmental protection and more and more strict waste discharge standards, it is desirable to develop efficacious new separative membranes with good mechanical, chemical and thermal strength.

One aim of the present invention is to propose a membrane for effectively separating different chemical species of comparable sizes in aqueous solution. In particular, this membrane makes it possible to selectively separate mineral ionic species in aqueous solution also containing organic species of comparable size.

A second aim of the invention is to provide membranes which make it possible to control the flow of water in the course of the separation of the species in aqueous solution, in order not to modify the properties of this solution. In particular, it is important, for some applications, not to dilute the solution to be treated, not to modify the pH, etc.

Another aim of the invention is to provide a membrane which has good mechanical and chemical strength.

Finally, another aim of the invention is to provide a method and a device for using this membrane.

These aims and others are achieved by the present invention, which consists of a selective membrane comprising a support covered with an active layer and a layer for increasing the hydrophobicity of the support, the membrane being obtainable by a method which comprises, in the following order the steps of, (a) applying, to one of the faces of the support, the layer for increasing the hydrophobicity of the support, and (b) applying to the other face of the support, the active layer which comprises an inorganic hydrogel material and an ion carrier.

This novel membrane has many advantages. It makes it possible to selectively separate ionic species in aqueous solution when these ionic species are present in the form of a chelate.

The membrane of the invention has good retention of organic species. When an aqueous solution contains ionic species in the form of a chelate as well as organic species, the membrane of the invention makes it possible to selectively separate the ionic species from the organic species, even when these species are of comparable sizes.

The membrane of the present invention also makes it possible to control the flows of water between the solution to be treated and the solution receiving the extracted ionic species (the trap solution).

These membranes have a high chemical and mechanical strength by virtue of the inorganic lattice which forms the active layer.

Compared with the existing liquid membranes, these membranes have the advantage of not containing any organic solvent. In the membranes of the invention, the organic solvent is replaced by the hydrogel (a highly hydrated inorganic three-dimensional lattice) which make them perfectly ecological.

The present invention also concerns a device for treating an aqueous solution containing chemical species to be separated, which comprises a first zone for receiving the solution to be treated and a second zone containing a trap solution, the two zones being separated by a selective membrane.

Contact between the active layer of the membrane of the invention and the solution to be treated can be direct or indirect, the membrane optionally comprising a protective layer for the active layer. The trap solution is an aqueous solution. In general the trap solution is water, preferably osmosed water.

In the following description, reference will be made to the drawings in which.

Figure 1:
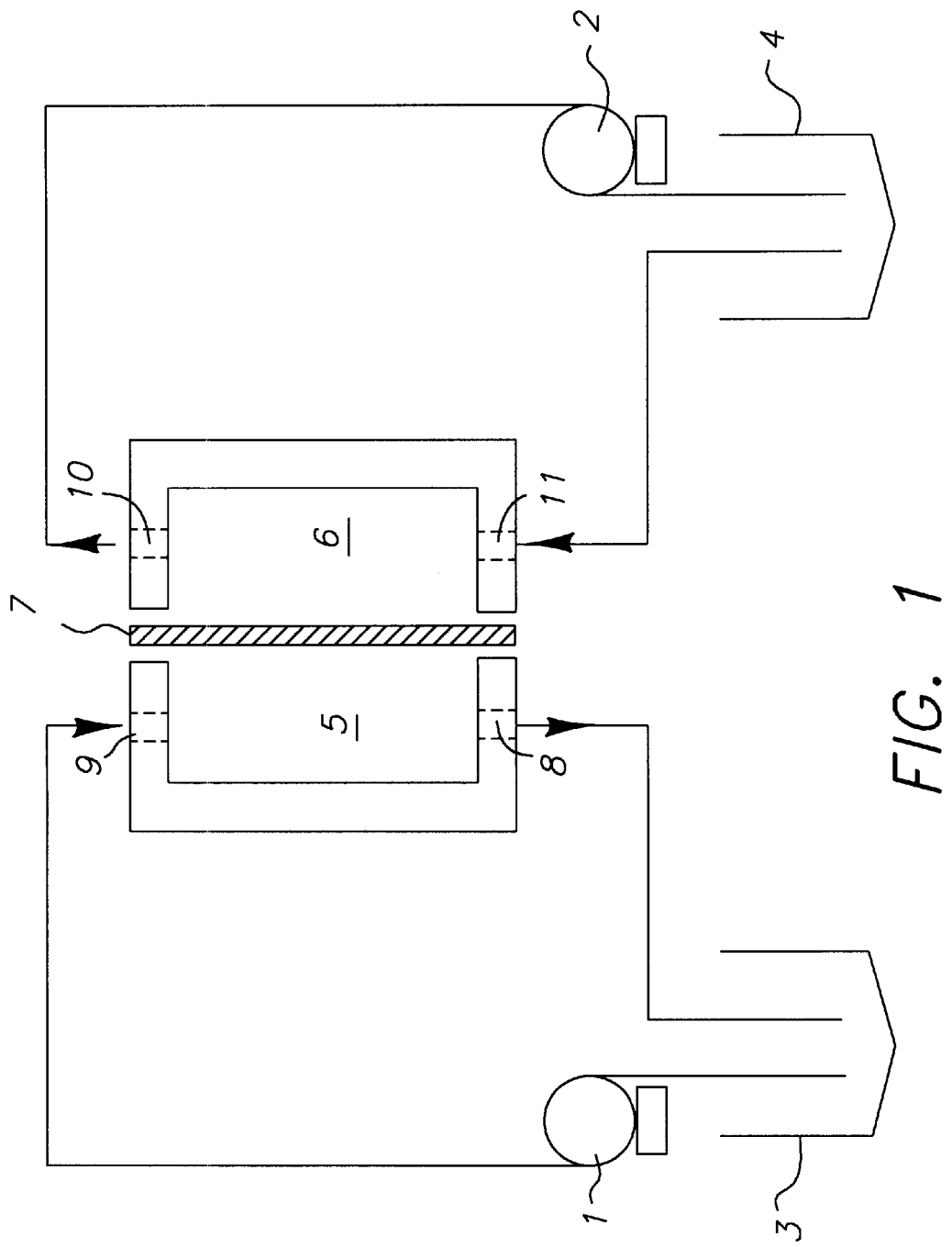
FIG. 1 is a separation device of the invention.
Figure 2:
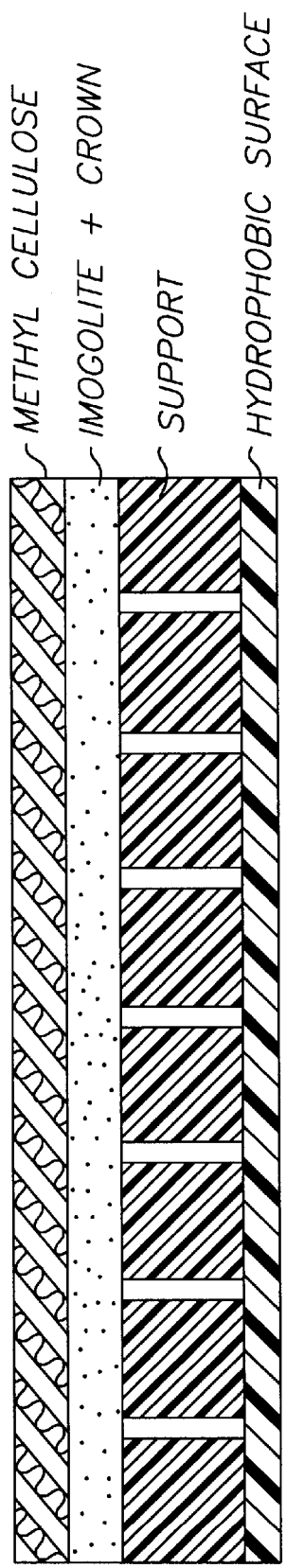
FIG. 2 is a view in section of an embodiment of the membrane of the present invention.

In the context of the present invention, the support is an organic or inorganic porous support. These organic or inorganic porous supports are well known products and in themselves constitute membranes. The porosity of the support is chosen according to the species to be selectively separated. Generally the porosity of the support is between 10 and 20 μm.

The inorganic supports are for example supports made of silica, alumina, zirconia or titanium oxide or a mixture of these oxides. They can also be made of carbon, optionally covered with a fine layer of oxide.

The organic supports are for example supports made of cellulose or cellulose derivatives, or polyacrylonitrile, polysulphone or polyethersulphone supports. In the context of the invention, supports having surface active groups, for example hydroxyl groups, are preferred. When the support chosen does not inherently have such surface active groups, it is possible to create them by means of a suitable chemical treatment of the support, for example by treating the support with an acid, a base or a silicon or aluminum halide. These active groups are generally hydroxyl groups or acids. According to a particular embodiment, the organic porous support is a cellulosic support.

The organic or inorganic supports can also include functionalised groups making it possible to have a positive surface charge (for example by introducing ammonium or phosphonium groups), or a negative surface charge (for example by introducing sulpho, carboxy, etc groups).

The supports can be in the form of plane, spiral or tubular modules or in the form of hollow fibres.

According to the invention, the membrane comprises an active layer comprising an inorganic hydrogel material and an immobilized ion carrier.

Such an inorganic hydrogel material is for example an aluminosilicate in the form of a gel or a phyllosilicate.

According to a preferred embodiment, the inorganic hydrogel material is an aluminosilicate of the imogolite type. Imogolite is a fibrous aluminosilicate polymer which has the formula AlxSiyOz in which the ratio x/y is between 1.5 and 2.5 and z is between 2 and 6. This aluminosilicate exists in the natural state; it was first described by Wada in J. Soil Sci. 1979, 30(2), 347–355.

Imogolite can be synthesized by different methods. Examples of synthesis are described in U.S. Pat. Nos. 4,252,779, 4,241,035 and 4,152,404 in the name of Farmer.

Imogolite can also be synthesized by the method described in the PCT/EP patent application No 95/04165, filed on Oct. 24, 1995 in the name of Kodak Pathe and Eastman Kodak. This method makes it possible to synthesize a majority of the imogolite in the form of fibres. The imogolite used in the examples of the present invention is prepared in accordance with the method described in this application.

In the context of the invention, the imogolite composition which applied to the support preferably contains between 0.5 and 5 g/l of imogolite.

In the context of the present invention, the ion carrier is a compound capable of complexing the ions to be extracted from the aqueous solution to be treated and to convey them in the receiving aqueous solution (the trap solution). These ion carriers are known in the art. They are in general macrocyclic compounds, for example macrocyclic polyethers, or quasi cyclic, which can contain one or more heteroatoms chosen for nitrogen (azacrown), sulphur, etc.

Examples of useful macrocyclic compounds were described in "Crown compounds, their characteristics and application", Michio Hiraoka, Elsevier 1982, ISBN 0-444-99692-3; "The chemistry of ethers, crown ethers, hydroxyl groups and their sulfur analogues", Paul Patai, Interscience Publication, 1980, ISBN 0-471-27771-1.

Macrocylic compounds which are useful in the present invention comply with one of the following formulae:

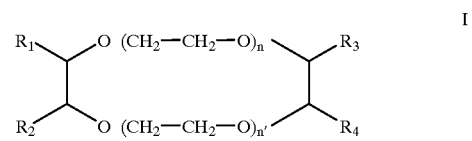

where $R_1$, $R_2$, $R_3$ and $R_4$ represent hydrogen or an alkyl, aryl, ester, amide, carboxy, ester, sulphonamido, sulpho, alkoxy, aryloxy or polyalkoxy group, or $R_1$ and $R_2$ and/or $R_3$ and $R_4$ represent the atoms needed to complete an aliphatic or aromatic ring with 5 to 7 members optionally comprising oxygen, sulphur or nitrogen heteroatoms on the ring, n and n' are between 1 and 10, the total of n and n' being at least 4;

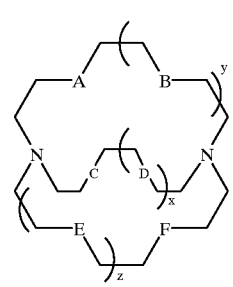

where A, B, C, D, E and F each represent separately an oxygen or sulphur atom, or N—$R_5$ where $R_5$ is hydrogen, an alkyl radical or else represents the atoms required to form, with two of the adjacent atoms, an aliphatic or aromatic ring with 5 to 7 members optionally comprising oxygen or sulphur atoms on the ring, x, y and z are between 1 and 3, provided that the total of the oxygen atoms is at least 6.

Preferred macrocyclic compounds are:

dibenzo-18-crown-6 of formula (A)

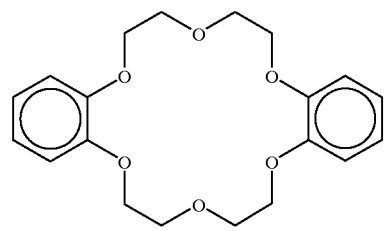

benzo-18-crown-6 of formula (B)

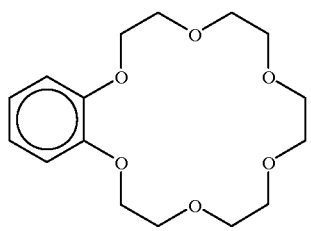

18-crown-6 of formula (C)

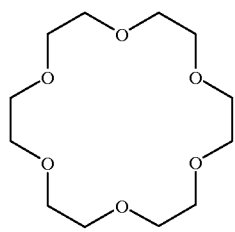

4,7,13,16,21,24-hexaoxa 1,10-diazabicyclo [8,8,8]-hexacosane of formula (D)

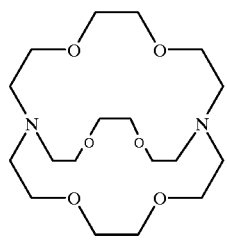

In the present invention, the ion carrier is mixed with the hydrogel material before being coated on the support. The layer obtained from this mixture forms the active layer in which the carrier is immobilized.

The concentration of ion carrier in the mixture is generally between $10^{-4}$ and 1 mol/l A of mixture.

According to the present invention, the surface of the membrane is modified in order to make it hydrophobic. The surface of the membrane can be modified by different methods known in the art. Depending on the nature of the membrane support, it may be advantageous to modify the surface of the membrane by a sol-gel process, the conditions of implementation of which are gentle and controlled, unlike other known methods such as CVD. The sol-gel method affords a greater choice of support, for example supports which are not high temperature resistant.

According to a preferred embodiment, the hydrophobicity of the surface of the membrane is modified according to a method which comprises the steps of:

a) applying, to one of the faces of the membrane, a homogeneous solution comprising one or more rare earth or alkaline earth fluoroalkoxides in an anhydrous organic solvent at room temperature, b) hydrolysing the fluoroalkoxide or fluoroalkoxides of the layer formed at a) and c) washing the membrane with water in order to eliminate the soluble salts formed.

These different steps can be reproduced several times in order to obtain the required hydrophilicity.

Such a method was described in detail in the patent application FR 9501541 filed on Nov. 22, 1995.

This method makes it possible to selectively modify the hydrophobicity of the membrane either solely on the external surface of the membrane or on the entire surface, that is to say all the external surfaces of the membrane and the specific surface area of the pores inside the membrane. The application of the layer of fluoroalkoxide can be repeated until the desired water flow is obtained.

In the context of the invention, it is preferable for the hydrophobicity of the support after treatment to be such that the water flow through the membrane is reduced by at least 50% compared with the water flow through the untreated support.

The fluoroalkoxides which can be used are for example the fluoroalkoxides of elements in group IIA, such as beryllium, magnesium, calcium, strontium, barium or radium fluoroalkoxide and the rare earth fluoroalkoxides chosen from amongst the fluoroalkoxides of elements in group IIIB, such as scandium, yttrium, lanthane, cerium, gadolinium, erbium or ytterbium fluoroalkoxide.

The preferred fluoroalkoxides are barium, calcium and strontium fluoroalkoxides. Such compounds are described in the patent application cited above.

The solution of fluoroalkoxides can be applied to the surface of the membrane by any known method for applying sol-gel, for example by using a coating bar, an air knife or a transfer cylinder or by immersion, plate coating, meniscus coating or curtain coating or by spraying or else by circulating the fluoroalkoxide in the reactor containing the membrane under suitable conditions.

In step b) the quantity of water required for hydrolysing the fluoroalkoxides must be at least equal to the stoichiometric quantity, and less than 5 times and preferably less than twice this stoichiometric quantity. The operation is generally carried out at ambient humidity. This hydrolysis can be combined with any other known complementary method which does not impair the support, such as placing the membrane in an oven at controlled humidity.

After hydrolysis, the solvent is left to evaporate.

The thickness of the layer obtained can be varied either by varying the initial concentration of metallic fluoroalkoxides or by repeating the sequence a)-b) several times and leaving the porous support in the open air for a few minutes between each deposition. It is also possible in the same way to produce several layers successively with fluoroalkoxides which are different through the nature of the alkoxo radical or by the nature of the alkaline earth metal (or rare earth).

At step c) the membrane is rinsed with water. This step eliminates the water-soluble metallic salts which could be detrimental when using the membrane to treat certain solutions, such as photographic solutions.

The different steps of the method can be implemented one or more times continuously.

In this way a support is obtained which is covered with an organic polymer resulting from the polymerization of the alkoxide radicals.

The present invention is described in more detail in the following examples.

EXAMPLES

EXAMPLE 1

Synthesis of Aluminosilicate Gel of the Imogolite Type

In an inert (polytetrafluoroethylene) reactor containing a solution of $AlCl_3,6H_2O$ (31.2 mmol) (manufactured by Aldrich®, 99% purity) and 1000 ml of demineralized water) there was added a solution of $Si(OEt)_4$ (16.7 mmol)

(manufactured by Ventron®, 99% purity) in 1000 ml of demineralised water. The mixture was stirred vigorously.

After 20 minutes, a solution of NaOH, 1M was added gently whilst stirring until a pH of 4.5 was obtained. In this way a cloudy solution was obtained.

After one night under stirring the solution became clear again. The pH was then adjusted by adding NaOH, 1M.

A white gel was obtained which was centrifuged at 2000 rpm for 20 min. The gel was then solubilized by adding 5 ml of a mixture (50/50) of hydrochloric acid (1M) and acetic acid (2M).

Demineralised water was added in order to obtain 1 liter of solution.

This solution (1) contains approximately 30 mmol of aluminum, 16.6 mmol of silicon and 5 mmol of acetic acid.

The solution thus obtained was diluted in two liters of water in order to obtain an aluminum concentration of 10 mmoles/l, and then heated to a temperature of between 95 and 100° C., in the presence of silanol.

After 120 hrs of heat treatment, the solution was cooled again, purified and concentrated by ultrafiltration.

EXAMPLE 2

Modification of the Surface of the Membrane Support by the Application of Barium Fluoroalkoxide
Formation of Barium Fluoroalkoxide Ba6R 13.6 g (0.0099 mol) of barium was put in solution under argon in 200 ml of anhydrous ethanol. The reaction was exothermic with the release of hydrogen. The reaction medium was filtered in order to eliminate the residual colloids. The filtrate was concentrated at $10^{-2}$ mm Hg and dried for 12 hrs in order to give a pulverulent white powder, the elementary analysis of which showed that it contained approximately 60% by weight of barium.

22.5 g of this power was introduced under argon into 300 ml of anhydrous tetrahydrofurane (THF), and then 21 ml of hexafluoro-2-propanol was added dropwise at room temperature.

The mixture was left to react for 2 hours under stirring (highly exothermic reaction). The product was purified by crystallization in anhydrous tetrahydrofurane. 42 g of white barium fluoroalkoxide powder was collected, the elementary analysis of which showed that it contained approximately 30% by weight of barium.

Formation of the Layer Modifying the Surface of the Support of the Membrane 1 g of barium fluoroalkoxide obtained previously was put in solution in 50 ml of anhydrous ethanol under inert gas. This solution was applied to a Spectra/Por® porous regenerated cellulose support having a cutoff threshold of 60000 to 8000 daltons (pore diameter approximately 2 nm) by coating. Four applications were performed on the support, and at each application a layer with a thickness of 125 µm was obtained. Between each deposition, the support was left in open air for 5 mins. Hydrolysis took place with atmospheric moisture. In this way four layers of barium fluoroalkoxide were deposited. The porous support was then immersed in osmosed water in order to eliminate the soluble salts present in the layer.

As the water flow values show (%$H_2O$; Table 1), the hydrophobicity of the face of the cellulose support treated with barium fluoroalkoxide had thus been greatly modified.

EXAMPLE 3

Preparation of the Membrane
3.1: modification of the hydrophobicity of the support A Spectra/Por® cellulose support as defined above was coated four times by means of a solution of Ba6R (a solution consisting of 1 g of solute in 50 ml of anhydrous methanol) as described previously. Between each layer of Ba6R, it was left to dry for a few minutes.

3.2: preparation of the active layer

The modified support as described above was then immersed in osmosed water for 1 hour.

The still wet support was coated on the untreated face with the solution containing the imogolite prepared according to the method of Example 1 and a crown ether (18.6 g of 18-crown-6 in solution in 50 g of imogolite (1.18 g/l, including Si=0.424 g and Al=0.753 g).

The support was once again immersed in osmosed water for 24 hrs. A second layer of the solution of imogolite and crown ether was then deposited on the previous layer. This solution was coated by means of a knife making it possible to obtain a 100 µm thick layer on the cellulose support. In this way the active layer of the membrane was obtained.

After drying, a protective layer of methyl cellulose was deposited on the last layer of imogolite-ether-crown under the same coating conditions using an aqueous solution of methyl cellulose (400 cp) at 0.2 g/l.

The selectivity results for the membrane thus obtained are set out in Table 1 below.

EXAMPLE 4

Comparative 18.6 g of 18-crown-6 was put in solution in 50 g of imogolite (0.98 g/l where Si=0.36 g and Al=0.62 g). This solution was coated using a blade which made it possible to deposit a layer with a thickness of 100 µm on a cellulose support as described previously. In this way the active layer was obtained.

After drying, a layer of methyl cellulose was deposited on the previous active layer under the same coating conditions using an aqueous solution of methyl cellulose (400 cp) at 0.2 g/l.

After drying, the back of the cellulose support was coated by means of a solution of barium fluoroalkoxide Ba6R prepared according to the method described in Example 2 (1 g of fluoroalkoxide in 50 ml of anhydrous methanol). Four passes over the support were effected by means of a blade enabling a 125 µm thick layer to be deposited. Between each deposition, the porous support was left in open air for 5 mm.

Hydrolysis took place through atmospheric moisture. The solvent was left to evaporate.

After 5 mins, the porous support was immersed in a beaker of osmosed water in order to eliminate the soluble barium salts formed.

The selectivity results for the membrane thus obtained are set out Table 1 below.

EXAMPLE 5

In this example, a solution containing solely the imogolite prepared according to the method of Example 1 was applied to a Spectra/Por® cellulose support whose hydrophobicity had not been modified.

The selectivity results for the membrane thus obtained are set out in Table 2 below.

EXAMPLE 6

In this example, a solution containing imogolite and the 18-crown-6 ion carrier described previously was applied to a Spectra/Por® cellulose solution whose hydrophobicity had not been modified.

The selectivity results for the membrane thus obtained are set out in Table 2 below.

EXAMPLE 7
Selectivity Results for the Membrane

EXAMPLE 7.1

In order to determine the separation characteristics of the membranes described previously, each of these membranes was put in contact with a photographic developing solution containing bromide ions to be eliminated selectively. The developer used contained:

| | |
|---|---|
| hydroquinone (HQ) | 21.00 g/l |
| hydroquinone monosulphate (KHQS) | 13.40 g/l |
| phenidone-A | 0.69 g/l |
| bromide* | 3.46 g/l |
| sulphite* | 8 g/l |
| pH adjusted to 9.9 | |
| water in sufficient quantity for obtaining 1 liter of solution | |

*The bromide and sulphite were in the form of Na salts.

The device depicted in FIG. 1 was used. The system was composed of two compartments 5 and 6 each containing approximately 50 ml, separated by a 10 cm² membrane 7, the whole forming a sealed system. 500 ml of developer contained in the reactor 3 circulated in the compartment 5 from the inlet 9 to the outlet 8 by means of a pump 1 with an output of 25 ml/min. 180 ml of water contained in the reactor 4 circulated in the reverse direction in the compartment 6 from the inlet 11 to the outlet 10 by means of the pump 2 with an output of 25 ml/min.

The separation results are set out in Table 1 below.

TABLE 1

RESULTS

| | H₂O flow | Br flow/24 hrs | Max tmin | FS1 | FS2 |
|---|---|---|---|---|---|
| Ex. 2 | 3% | 28% | 600 | 2.2 | 3.6 |
| Ex. 3 | 3% | 32% | 960 | infinite | 3.0 |
| Ex. 4 | 6.6% | 28% | 1440 | 5.6 | 2.3 |

These examples show that, with the membrane of the present invention, the water flow is greatly reduced. With such a membrane, a maximum extraction selectivity for the membrane is also obtained. In Example 4, the comparative membrane has a greater reduced selectivity and a high water flow. These results show that the membrane of the invention greatly increases the selectivity whilst reducing the hydroquinone and hydroquinone monosulphonate losses.

TABLE 2

| | H₂O flow | Br flow/24 hrs | Max tmin | HQ + KHQS + (extracted) | FS1 | Phenidone (extracted) | FS2 |
|---|---|---|---|---|---|---|---|
| Ex. 5 | 3% | 33% | 600 | 12 | 2.6 | 7% | 2.3 |
| Ex. 6 | 3% | 34% | 480 | 6 | 2.8 | 1.8% | 3.5 |
| Ex. 2 | 3% | 28% | 600 | 9.5 | 2.2 | 5.8% | 3.6 |
| cellulose* | 6% | 29% | 600 | 19 | 2.0 | 12% | 1.8 |

*in this example, the Spectra/Por ® cellulose support is used as a membrane without any other treatment.

If a comparison is made of the results obtained with the untreated cellulose and Example 5, it is clear that the imogolite coating on the cellulose support modifies the hydrophilic/hydrophobic balance of the membrane. A reduction in the water flow through the membrane is noted without however affecting the extraction kinetics of the bromide ions. The introduction of a carrier in the imogolite strongly increases the extraction kinetics of the bromide ions without modifying the water flow. In addition, the organics loss is reduced when the carrier is present. The extraction of the bromide ions in this case is much more selective.

None of these membranes gives results as effective as those obtained with the present invention.

EXAMPLE 7.2

In this example, the separation characteristics of the membranes described previously were determined by putting each of these membranes in contact with an ascorbic acid developer containing bromide ions to be eliminated selectively. The developer used contained:

| | |
|---|---|
| potassium carbonate | 400 g |
| K₂SO₃ (45% p) | 222 g |
| benzotriazole | 0.4 g |
| HMMP | 5 g |
| Potassium bromide | 8 g |
| Antical 8 ® (40%) | 8.6 g |
| Ascorbic acid | 64 g |
| Water in sufficient quantity for obtaining 2 liters of solution. | |

HMMP: hydroxymethylmethyl pyrazolidinone.
As before, the device depicted in FIG. 1 was used.

The separation results are set out in Table 3 below.

TABLE 3

| | H₂O flow | Br flow/24 hrs | Max tmin | FS3 | FS4 |
|---|---|---|---|---|---|
| Ex. 3 | 5.4% | 31% | 360 | infinite | 3.6 |
| Ex. 4 | 7.2% | 25% | 360 | 0.6 | 0.8 |

These examples show that, with the membrane of the present invention, the water flow is greatly reduced. These results show that the membrane of the invention greatly increases the selectivity whilst reducing the ascorbic acid losses.

Definition of the Parameters of the Different Tables

Max tmin: period necessary for reaching the maximum bromide extraction value or at least 80% of the value at 24 hrs, reversal point). FS1: extraction selectivity for Br ions compared with hydroquinone (HQ) and hydroquinone monosulphonate (KHQS) at Max tmin. FS2: extraction selectivity for bromide ions compared with phenidone at Max tmin. HQ+KHQS (extracted): % HQ and KHQS present in water at 24 hrs. Phenidone (extracted): % phenidone present in water at 24 hrs. FS3: extraction selectivity for Br versus ascorbic acid at Max tmin. FS4: extraction selectivity for bromide compared with HMMP at Max tmin.

What is claimed is:

1. Selective membrane comprising a support covered with an active layer and a layer for increasing the hydrophobicity of the support, the membrane being obtainable by a method which comprises, in the following order the steps of, (a) applying, to one of the faces of the support, the layer for increasing the hydrophobicity of the support and (b) applying, to the other face of the support, the active layer which comprises an inorganic hydrogel material and an ion carrier.

2. Membrane according to claim 1, wherein the hydrogel material is imogolite.

3. Membrane according to claim 1, wherein the ion carrier is selected from macrocyclic polyethers or macrocyclic polyethers containing one or more heteroatoms selected from sulphur, nitrogen or oxygen.

4. Membrane according to claim 3, wherein the ion carrier has the formula:

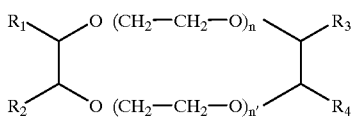

wherein $R_1$, $R_2$, $R_3$ and $R_4$ represent hydrogen atom or an alkyl, aryl, ester, amide, carboxy, ester, sulphonamido, sulpho, alkoxy or aryloxy or polyalkoxy group, or $R_1$ and $R_2$ and/or $R_3$ and $R_4$ represent the atoms required to complete an aliphatic or aromatic ring with 5 to 7 members optionally comprising oxygen, sulphur or nitrogen heteroatoms on the ring, n and n' are between 1 and 10, the total of n and n' being at least 4.

5. Membrane according to claim 3, wherein the ion carrier has the formula:

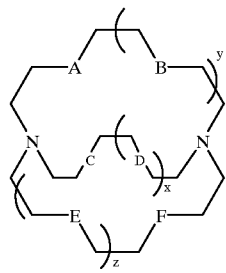

where A, B, C, D, E and F each represent separately an oxygen or sulphur atom, or N—$R_5$ wherein $R_5$ is hydrogen, an alkyl group or else represents the atoms required to form, with two of the adjacent atoms, an aliphatic or aromatic ring with 5 to 7 members optionally comprising oxygen or sulphur atoms on the ring, x, y and z are between 1 and 3, provided that the total of the oxygen atoms is at least 6.

6. Membrane according to claim 1, wherein the layer for increasing the hydrophobicity of the support is obtained by applying a solution of rare earth and/or alkaline earth fluoroalkoxide on the support, hydrolysing and washing the layer.

7. Membrane according to claim 1 which comprises a protective layer on the active layer.

8. Membrane according to claim 1 wherein the layer for increasing the support hydrophobicity is such that the water flow through the membrane is reduced by at least 50% compared with the water flow through the untreated support.

9. Device for treating an aqueous solution containing chemical species to be separated which comprises a first zone for receiving the solution to be treated and a second zone containing a trap solution, the two zones being separated by a selective membrane defined according to any one of claims 1 to 8.

10. Method for selectively separating ionic species capable of being chelated in aqueous solution, wherein the aqueous solution containing the ionic species to be selectively separated is put in contact with the active layer of the membrane as defined in any of claims 1 to 8, the other face of the membrane being in contact with a trap solution.

* * * * *